United States Patent
Lu et al.

(10) Patent No.: US 9,642,201 B2
(45) Date of Patent: May 2, 2017

(54) LIGHTING SYSTEM

(71) Applicant: Radiant Opto-Electronics Corporation, Kaohsiung (TW)

(72) Inventors: Cheng-Lin Lu, Kaohsiung (TW); Jon-Hong Lin, Kaohsiung (TW); Chun-Yi Sun, Kaohsiung (TW); Ko-Yu Hsiao, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 14/714,335

(22) Filed: May 17, 2015

(65) Prior Publication Data

US 2015/0257227 A1 Sep. 10, 2015

Related U.S. Application Data

(63) Continuation-in-part of application No. 13/861,381, filed on Apr. 12, 2013, now Pat. No. 9,072,127.

(30) Foreign Application Priority Data

Jun. 29, 2012 (TW) .............................. 101123469 A
Dec. 28, 2012 (TW) .............................. 101151060 A

(51) Int. Cl.

| | |
|---|---|
| *H05B 33/08* | (2006.01) |
| *H05B 37/02* | (2006.01) |
| *F21V 23/00* | (2015.01) |
| F21V 23/04 | (2006.01) |
| H02M 7/12 | (2006.01) |
| H02M 1/44 | (2007.01) |
| F21Y 115/10 | (2016.01) |

(52) U.S. Cl.

CPC ....... *H05B 33/0845* (2013.01); *F21V 23/003* (2013.01); *H05B 33/0815* (2013.01); *H05B 37/0272* (2013.01); *F21V 23/0435* (2013.01); F21Y 2115/10 (2016.08); H02M 1/44 (2013.01); H02M 7/12 (2013.01); Y02B 20/347 (2013.01)

(58) Field of Classification Search

USPC ........ 315/185 R, 192, 200 R, 201, 246, 291, 315/312, 361, 362

See application file for complete search history.

(56) References Cited

U.S. PATENT DOCUMENTS

| 2005/0218838 A1 | 10/2005 | Lys |
|---|---|---|
| 2007/0029946 A1 | 2/2007 | Yu et al. |

(Continued)

FOREIGN PATENT DOCUMENTS

| JP | 03-230410 | 10/1991 |
|---|---|---|
| JP | 2003-157986 A | 5/2003 |

(Continued)

*Primary Examiner* — Douglas W Owens
*Assistant Examiner* — Jianzi Chen
(74) *Attorney, Agent, or Firm* — CKC & Partners Co., Ltd.

(57) ABSTRACT

A lighting system, which is composed of a redundant power supply and at least one luminaire with a lamp control module contained therein. The lamp control module includes at least one light source and a light control module. The light control module includes a current control unit, at least one switch unit, and a processing unit. The current control unit is to control the DC current. The switch unit is electrically connected to the light source and enables the DC current source to selectively control DC current to at least one light source. The processing unit is used to adjust value of DC current. The luminaire includes the lamp control module, housing and power lines. The redundant power supply contains at least one AC-to-DC converter module, and the redundant power supply provides constant DC power to at least one light control module of the luminaire.

14 Claims, 9 Drawing Sheets

(56) References Cited

U.S. PATENT DOCUMENTS

| | | |
|---|---|---|
| 2008/0002399 A1 | 1/2008 | Villard et al. |
| 2009/0189547 A1 | 7/2009 | Spartano et al. |
| 2011/0133655 A1 | 6/2011 | Recker |
| 2012/0049765 A1 | 3/2012 | Lu et al. |
| 2012/0098442 A1 | 4/2012 | Jin et al. |
| 2012/0274240 A1 | 11/2012 | Lee et al. |
| 2013/0026931 A1 | 1/2013 | Jong et al. |

FOREIGN PATENT DOCUMENTS

| | | |
|---|---|---|
| JP | 2004-39289 A | 2/2004 |
| JP | 2004-111104 A | 4/2004 |
| JP | 2006164727 A | 6/2006 |
| JP | 2007134430 A | 5/2007 |
| JP | 3140783 U | 3/2008 |
| JP | 2008085324 A | 4/2008 |
| JP | 2008091311 A | 4/2008 |
| JP | 2009-159687 A | 7/2009 |
| JP | 2010-021008 A | 1/2010 |
| JP | 2010-040389 A | 2/2010 |
| JP | 2010-140675 A | 6/2010 |
| JP | 2010-267481 A | 11/2010 |
| JP | 2011-70945 A | 4/2011 |
| JP | 2011519468 A | 7/2011 |
| JP | 2012-4240 A | 1/2012 |
| JP | 2012-014980 A | 1/2012 |
| JP | 2012-84263 A | 4/2012 |
| TW | 200626012 | 7/2006 |
| TW | 200934294 A | 8/2009 |
| WO | 2010085882 A1 | 8/2010 |
| WO | 2011014963 A1 | 2/2011 |
| WO | 2011023927 A1 | 3/2011 |
| WO | 2011087681 A1 | 7/2011 |

LIGHTING SYSTEM

RELATED APPLICATIONS

This application is a continuation-in-part of U.S. application Ser. No. 13/861,381, filed on Apr. 12, 2013, which claims priority to Taiwan Application Serial Numbers 101123469 and 101151060, filed Jun. 29, 2012 and Dec. 28, 2012, contents of which are incorporated by reference herein in their entirety for all intended purposes.

BACKGROUND

Field of Invention

The present invention relates to a lighting system, including at least one luminaire and with its respective lamp control module. More particularly, the present invention relates to a centralized and hot pluggable power system with redundant power source, at least one luminaire having the features of small size, light weight, low electromagnetic interference (EMI), long lifetime, and easy to maintain; and a lighting system employing the above luminaire.

Description of Related Art

Lighting devices play an important role in human life, and may be applied in various areas such as in a building, in a vehicle, or on a decoration article. Lighting device is not only an illumination tool but has great impact on human daily life.

Common lighting devices include incandescent lamps, fluorescent lamps, light emitting diode (LED) lamps, etc. In a conventional incandescent lamp, electricity is conducted through tungsten filaments to generate light by high heat. However, such incandescent lamp consumes a lot of power, and hence a fluorescent lamp is becoming a substitute of incandescent lamp.

A fluorescent lamp generally applies high voltage on electrodes to emit electrons hitting mercury vapor atoms for generating ionization and excitation phenomena. When the mercury vapor atoms return to an original state from an excitation state, an electromagnetic wave of 253.7 nm in wavelength is emitted, wherein the wavelength of 253.7 nm is in an invisible light wavelength range. Thereafter, various fluorescent materials can be used to absorb and convert the electromagnetic wave into visible light, such that the fluorescent lamp may emit various colors of light in accordance with the fluorescent materials.

For achieving the goals of energy saving and environmental protection, a light-emitting diode (LED) module is developed. When a LED is under a proper forward voltage, electrons and holes are respectively injected to N and P terminals. Then, energy is released in the form of light when the electrons drop to a basic state from an excited state at the P/N junction, thereby enabling the LED to emit light.

The LED requires a DC current, and hence LED lamps generally include an AC-to-DC converter inside for converting AC to DC current. In general, a common AC-to-DC converter is a switching type. Even with a better power conversion ratio, the switching inverter is bigger and has the worse EMI, causing LED lamps to have a larger size and complicated design to pass safety regulations. Further, the lifetime of LEDs is longer than that of other electronic elements within the AC-to-DC converter, such as the electrolytic capacitor. Therefore, if the AC-to-DC converter could be disposed outside, the luminaire shall have longer lifetime and the AC-to-DC converter shall be easier to maintain.

Therefore, there is a need to develop a lighting system in smaller size with lower EMI.

SUMMARY

An aspect of the present invention is to provide a lighting system including a luminaire with a lamp control module. The luminaire and the lamp control module only use electric devices with lower EMI and smaller size for providing electric power to light sources, and thus the lighting system also provides a luminaire with small size and low EMI.

According to an embodiment of the present invention, the lighting system includes at least one AC-to-DC modularized power supply and at least one luminaire. The luminaire includes at least one light source, a light control module, a housing and a power line. The light control module is electrically connected to light source for providing a DC current source to drive the light source. The light control module includes a current control unit, at least one switch, and a processing unit. The current control unit is used for providing the DC current. The switch unit is electrically connected to the light source enabling the DC current source to selectively provide DC current to at least one light source in accordance with switch unit control signal. The processing unit is electrically connected to the current control unit for adjusting the DC current. The light source and the light control module are located inside the housing. The power line is disposed through the housing and electrically connected between the light control module and the AC-to-DC modularized power supply for providing the DC voltage to the light control module. The AC-to-DC modularized power supply includes at least one AC-to-DC power module used for converting an AC voltage to a DC voltage, and providing DC voltage to the light control module.

According to still another embodiment of the present invention, the lamp control module includes at least one light source and a light control module. The light control module is electrically connected to the light source for providing a DC current source to drive the light source. The light control module includes a current control unit, at least one switch, and a processing unit. The current control unit acts as a constant DC current source. The switch unit is electrically connected to at least one light source to enable the DC current source for selectively providing DC current to at least one light source in accordance with switch unit control signal. The processing unit is electrically connected to the current control unit to adjust the DC current.

According to another embodiment of the present invention, the luminaire includes at least one light source, a lamp control module, a housing, and a power line. The light control module is electrically connected to the light source for providing current to drive the light source. The light control module includes a current control unit, at least one switch, and a processing unit. The current control unit acts as a constant DC current source. The switch unit is electrically connected to the light source for enabling the DC current source to selectively provide DC current to at least one light source in accordance with switch unit control signal. The processing unit is electrically connected to the current control unit to adjust the DC current to the light source. The housing receives the light source and the light control module. The power line is disposed through the housing and electrically connected to the light control module for providing the DC voltage to the light control module.

It can be understood from the foregoing descriptions that the luminaire of the embodiments of the present invention only uses low EMI and small sized current control units to provide a DC power to light sources, and by disposing the AC-to-DC modularized power supply outside the luminaire to decrease the EMI and the size of the luminaire.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
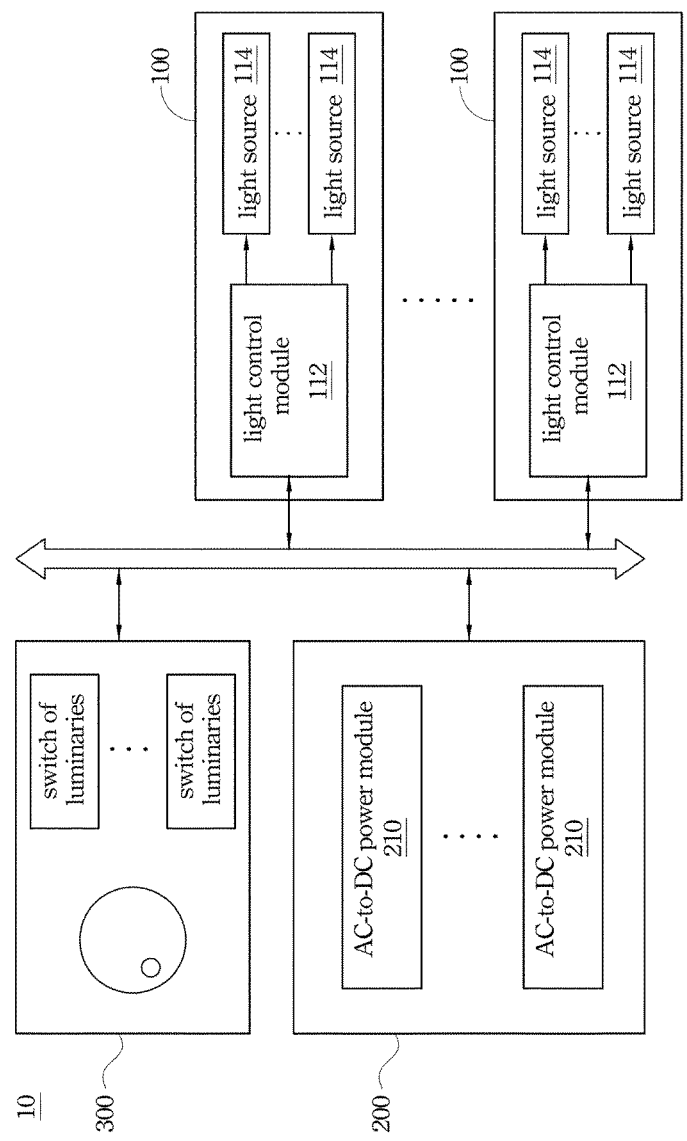
FIG. 1 is a schematic functional block diagram showing a lighting system in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, it is a schematic functional block diagram showing a lighting system 10 in accordance with an embodiment of the present invention. The lighting system 10 includes at least one luminaire 100, at least one AC-to-DC modularized power supply 200, and at least one light-adjusting device 300. The AC-to-DC modularized power supply 200 includes at least one AC-to-DC power module 210. The AC-to-DC power module 210 is used to receive the city power of a utility grid, and to convert the AC city power to a DC voltage source providing to a light control module 112 of the luminaire 100. In this embodiment, the light-adjusting device 300 can be an analog dimming module (such as an analog resistance dimming module) or a digital protocol dimming module (such as a digital addressable lighting interface module) for a user to control the luminance of the luminaire 100.

The AC-to-DC modularized power supply 200 can be disposed, but not limited thereto, in a panel box of a building, and the luminaire 100 can be electrically connected to the AC-to-DC modularized power supply 200 through wirings of the building. As a result, not only that EMI of the AC-to-DC modularized power supply 200 is prevented, but the luminaire 100 can be replaced or installed conveniently. Besides, the AC-to-DC power modules 210 have the features of redundant and hot pluggable, and thus, where the AC-to-DC modularized power supply 200 has plurality AC-to-DC power modules 210, if one of the AC-to-DC power modules 210 is broken, which can be removed and be replaced by a new one directly without influencing the lighting function of the luminaire 100.

Figure 2:
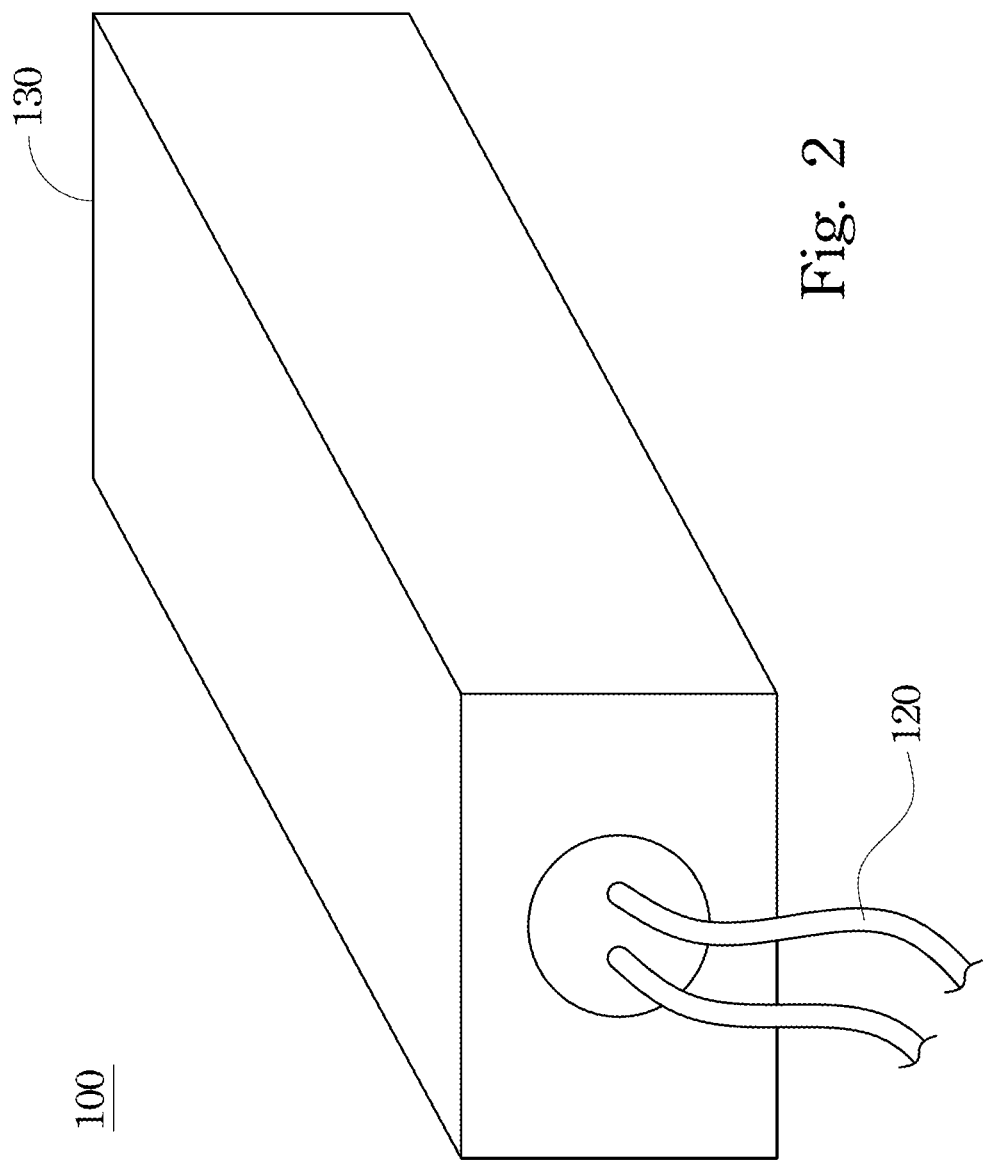
FIG. 2 is a schematic diagram showing an appearance structure of a luminaire in accordance with an embodiment of the present invention.
Figure 3:
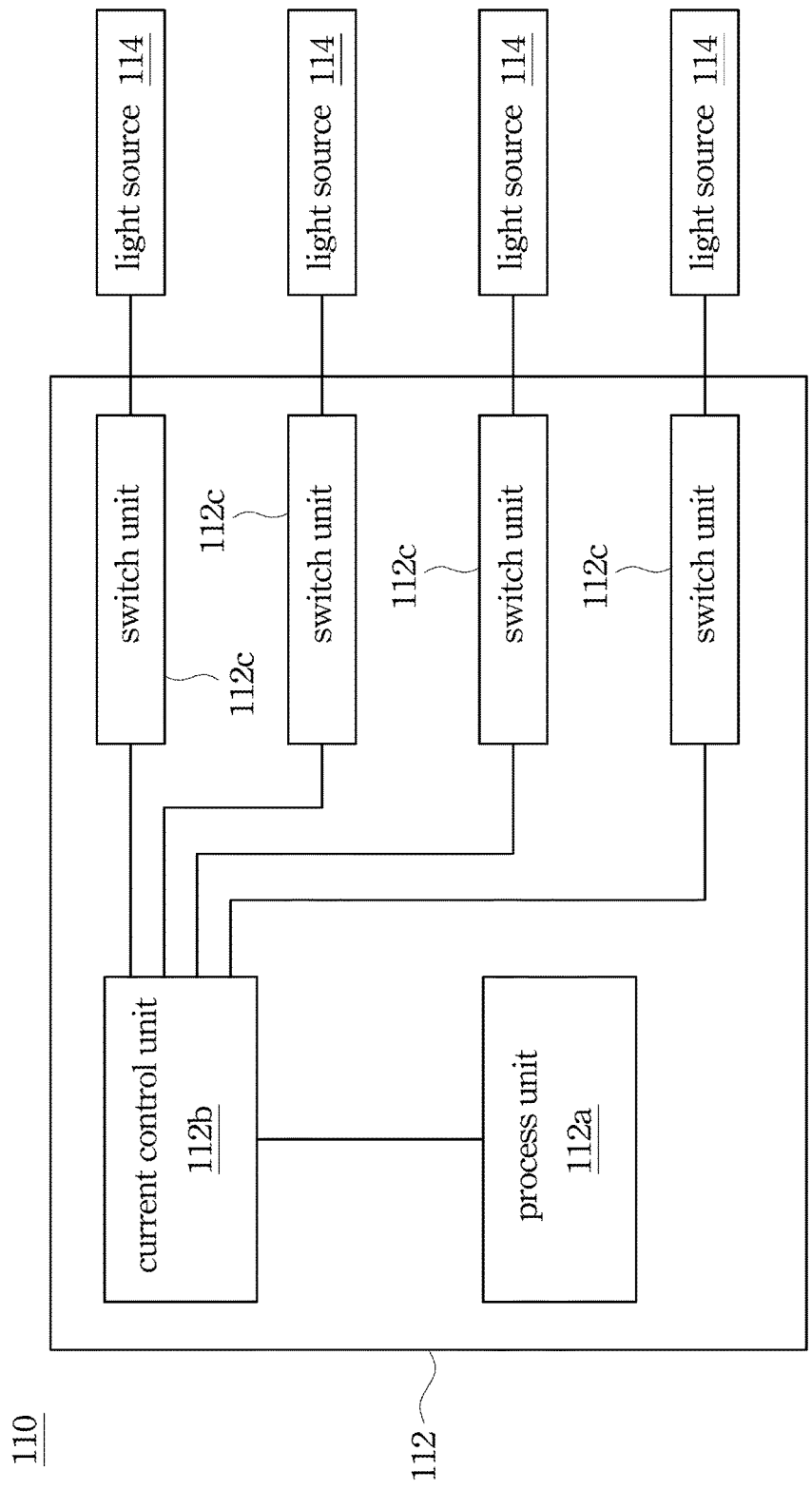
FIG. 3 is a schematic functional block diagram showing a lamp control module of the luminaire in accordance with an embodiment of the present invention.

Referring to FIG. 2 and FIG. 3 simultaneously, FIG. 2 is a schematic diagram showing an appearance structure of the luminaire 100 in accordance with an embodiment of the present invention, and FIG. 3 is a schematic functional block diagram showing a lamp control module 110 of the luminaire 100 in accordance with an embodiment of the present invention. The luminaire 100 includes the lamp control module 110, a power line 120, and a housing 130. The lamp control module 110 is disposed in the housing 130, and includes light source 114 and light control module 112. The power line 120 is disposed through the housing 130 and electrically connected to the lamp control module 110 for providing DC voltage source to the light control module 112 of the lamp control module 110.

As shown in FIG. 3, the lamp control module 110 includes at least one light source 114 and at least one light control module 112. The light control module 112 includes a processing unit 112a, a current control unit 112b, and at least one switch unit 112c. In this embodiment, the light sources 114 are light-emitting diodes (LEDs), but not limited thereto. In other embodiments, the light sources 114 can be other types of light source using DC electric power. The light control module 112 is used for selectively providing DC current to the light sources 114 so as to turn on all or a portion of the light sources 114. Details of the function of each part of the light control module 112 are explained below.

The current control unit 112b is used for receiving a DC voltage provided by an external power source through the power line 120, converting the DC voltage into a DC current to the light sources 114, and providing switch control signals to the switch units 112c. The switch units 112c are electrically connected between the current control unit 112b and the light sources 114 for selectively providing the DC current to at least one light source 114, wherein control terminals of the switch units 112c are electrically connected to the current control unit 112b so as to execute on/off operations in accordance with the switch control signals transmitted by the current control unit 112b.

The processing unit 112a is electrically connected to the current control unit 112b, which determines the switch control signals to the current control unit 112b, as well as adjusts the DC current of the current control unit 112b, in accordance with a user control signal. For example, when a user desires to turn on four light sources and maximizes the brightness, the user may transmit a control signal to the processing unit 112a by an electrical device (such as a remote controller). After receiving the signal, the processing unit 112a transmits signals to the current control unit 112b to determine values of the switch control signals, whereas the current control unit 112b transmits the switch control signals to the switch units 112c to turn on four switch units so as to provide four current channels to four of the light sources 114. Meanwhile, the processing unit 112a also controls the current control unit 112b to adjust the DC current to maximum so as to enable the four light sources 114 to emit light with maximum brightness.

In this embodiment, all elements of the light control module 112 are surface mounted devices (SMD). For example, to implement the actual circuit of the light control module 112, the processing unit 112a and the current control unit 112b can be integrated circuits with a TSSOP、SSOP or MSOP package type, and the passive elements thereof can be chip resistors or chip capacitors, and the switch unit 112c can be a SOT, SMA, or TO series (for example TO-251) package.

In addition, all elements of the light control module 112 are surface mounted devices (SMD) without using the switch converter technique, and hence the light control module 112 does not require large-scale energy storage elements used for energy-conversion, and does not require high frequency pulse-width modulation (PWM) signals frequently applied for driving the switch units. Therefore, the light control module 112 has a very small total volume and low EMI advantageously. However, the light control module 112 also may use the switch converter technique to implement actual circuits.

According to the above descriptions, the lamp control module 110 of the embodiments of the present invention does not include an AC-to-DC converter. The light control module 112 of the lamp control module 110 consists of the processing unit 112a, the current control unit 112b, the switch units 112c, and other necessary passive components (such as resistors and capacitors, etc.). Because the lamp control module 110 only provides DC current thru the current control unit 112b the electromagnetic disturbance (EMI) of the lamp control module 110 can be reduced significantly.

In addition, because the light control module 112 of the embodiment of the present invention does not include an AC-to-DC converter, the height of the light control module 112 is greatly decreased. In this embodiment, the light control module 112, the maximum height of the light control module 112 is 0.66 cm, but embodiments of the present invention are not limited thereto. The height of the light control module 112 can be further decreased due to a connection interface (such as a connector) applied by the light control module 112. For example, if the light control module 112 only relies on wires to connect with external devices without using the connector, the height of the light control module 112 can be further reduced to be smaller than 0.66 cm.

Figure 3A:
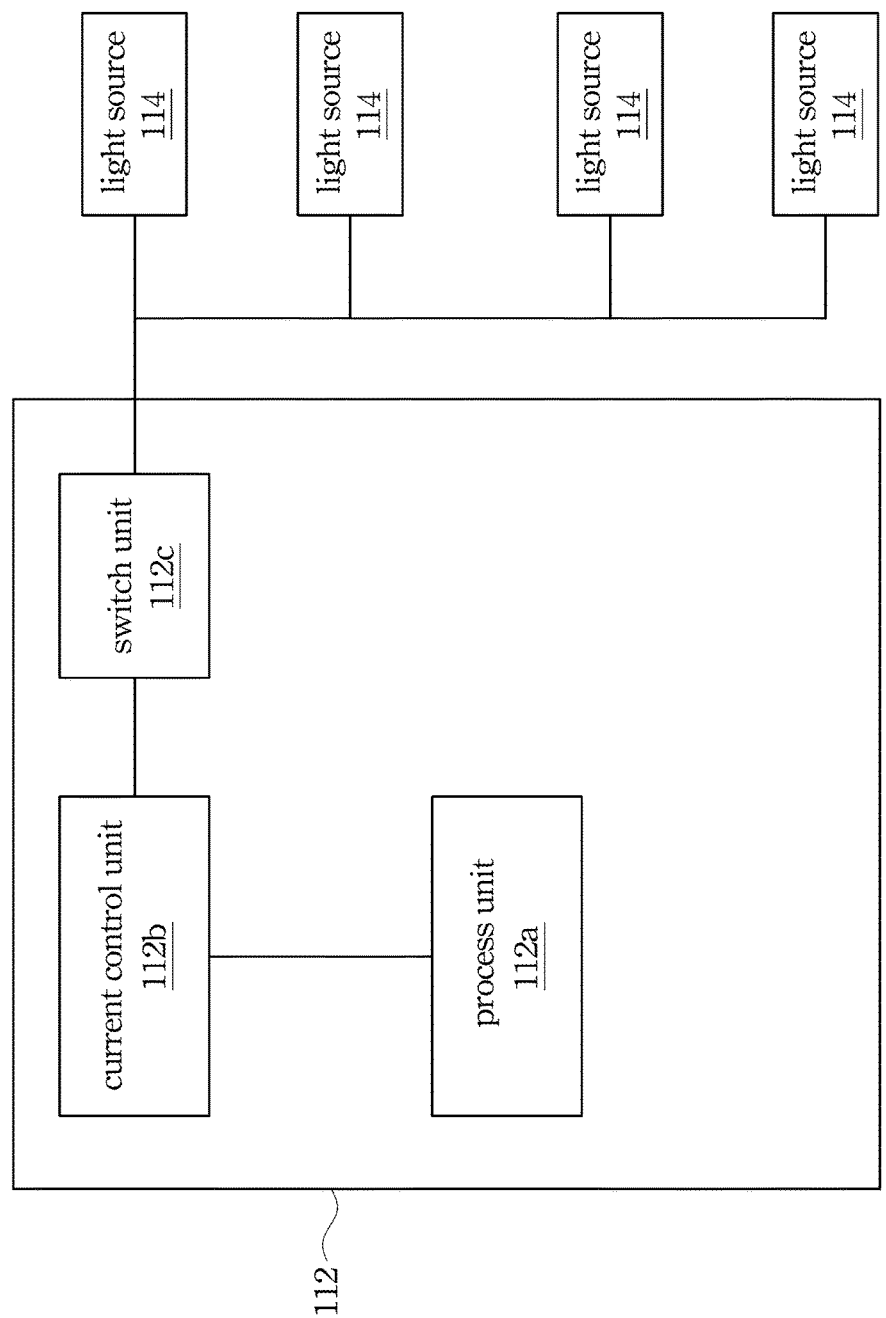
FIGS. 3A-3E are schematic functional block diagrams showing lamp control modules in accordance with an embodiment of the present invention.
Figure 3B:
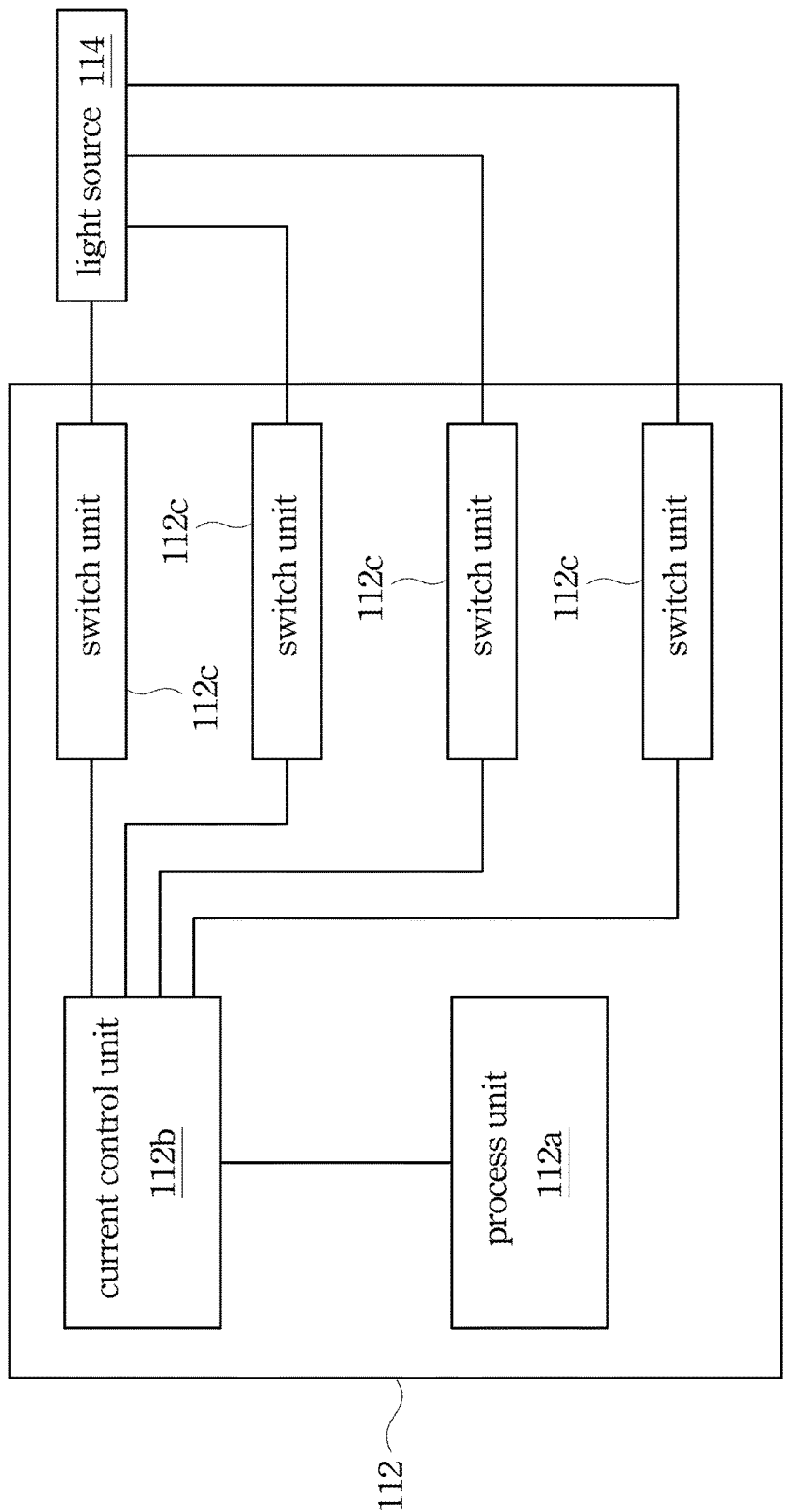
Figure 3C:
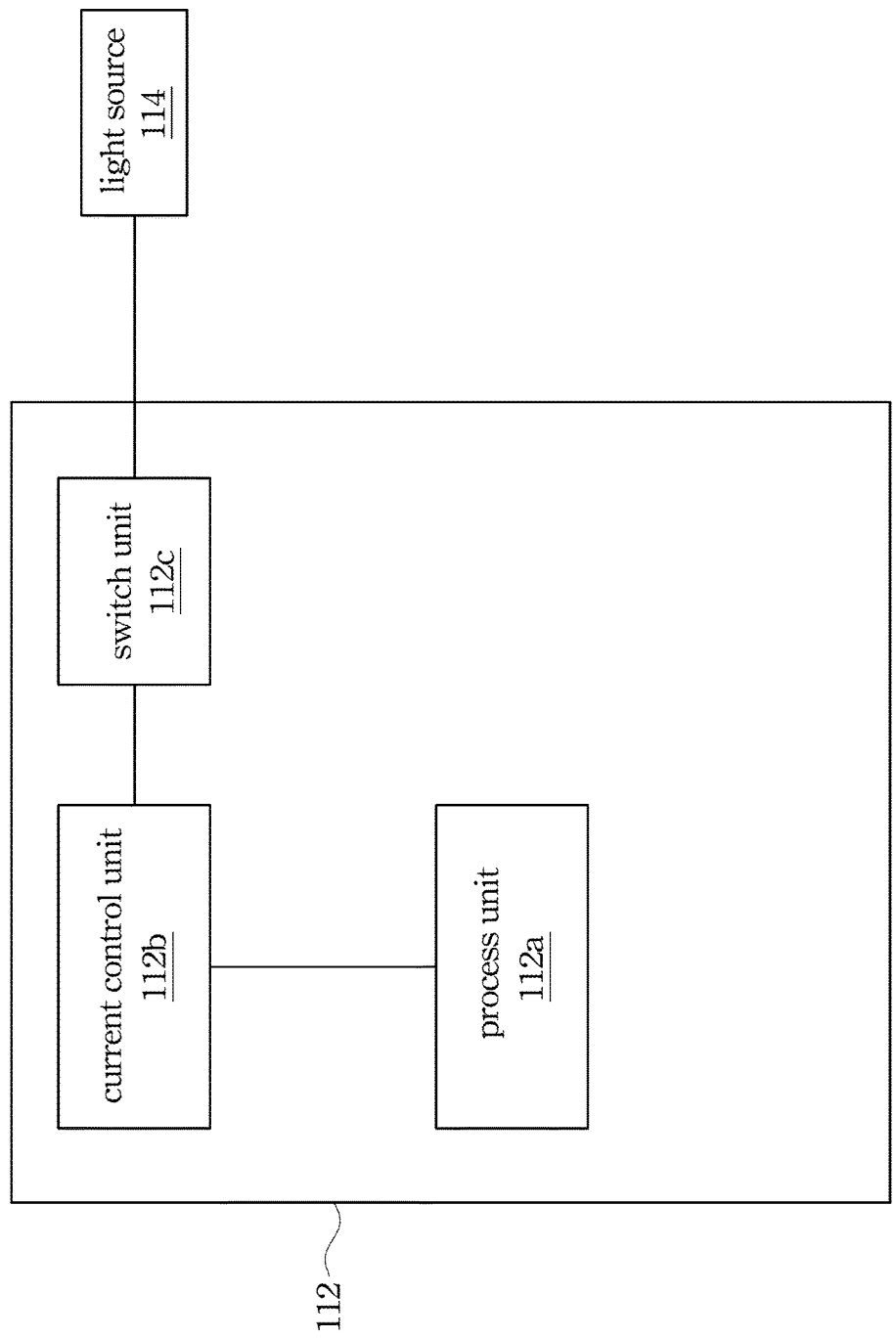

It is noted that, in another embodiment, it is not limited to one switch unit 112c connecting to one light source 114 only. For example, in another embodiment, the corresponding relationship between the switch units 112c and the light sources 114 can be one switch unit connecting to many light sources or many switch units connecting to many light sources, as shown in FIG. 3A and FIG. 3B. In another example, in another embodiment, only one switch unit 112c and one light source 114 are included in the luminaire 100, as shown in FIG. 3C.

Figure 3D:
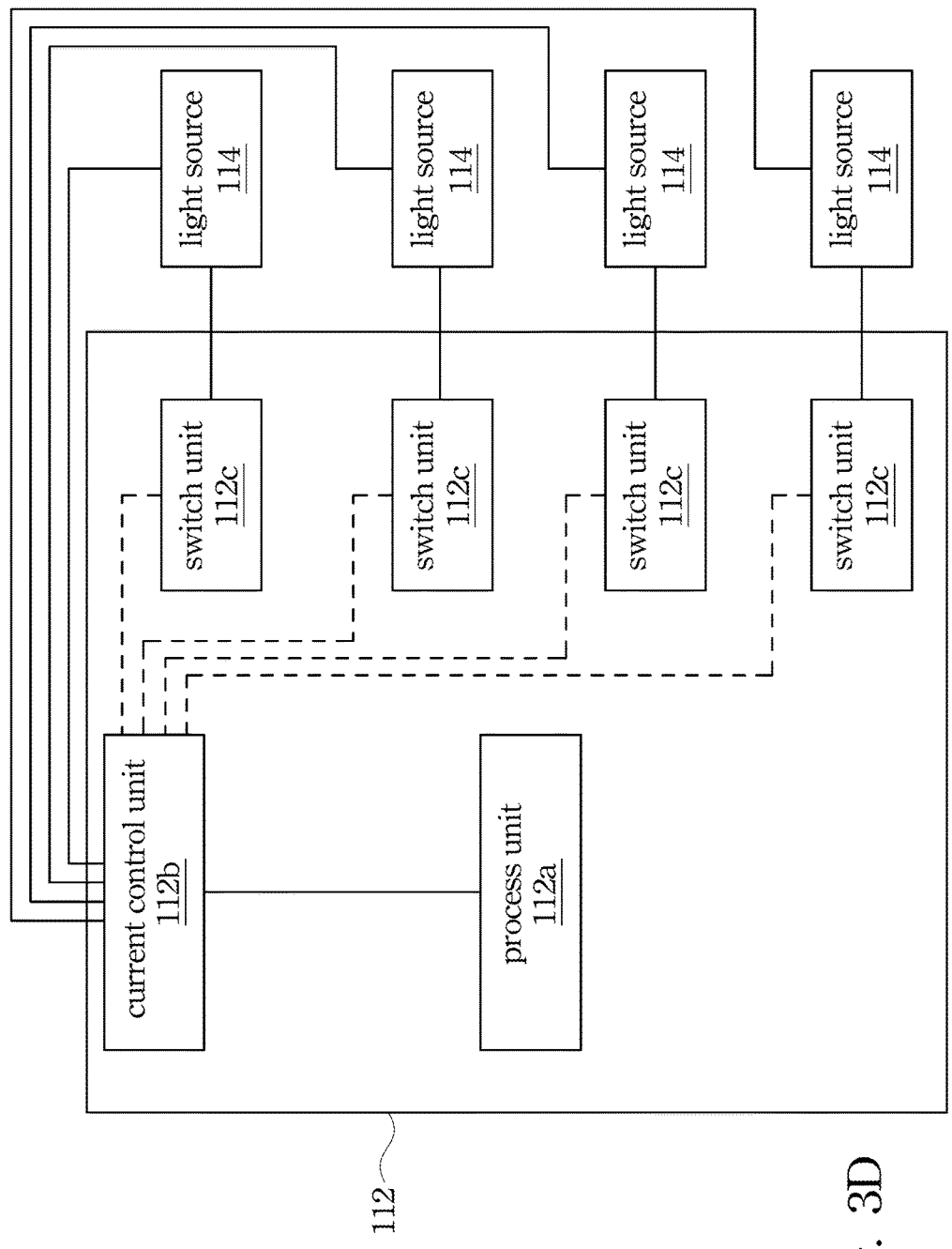
Figure 3E:
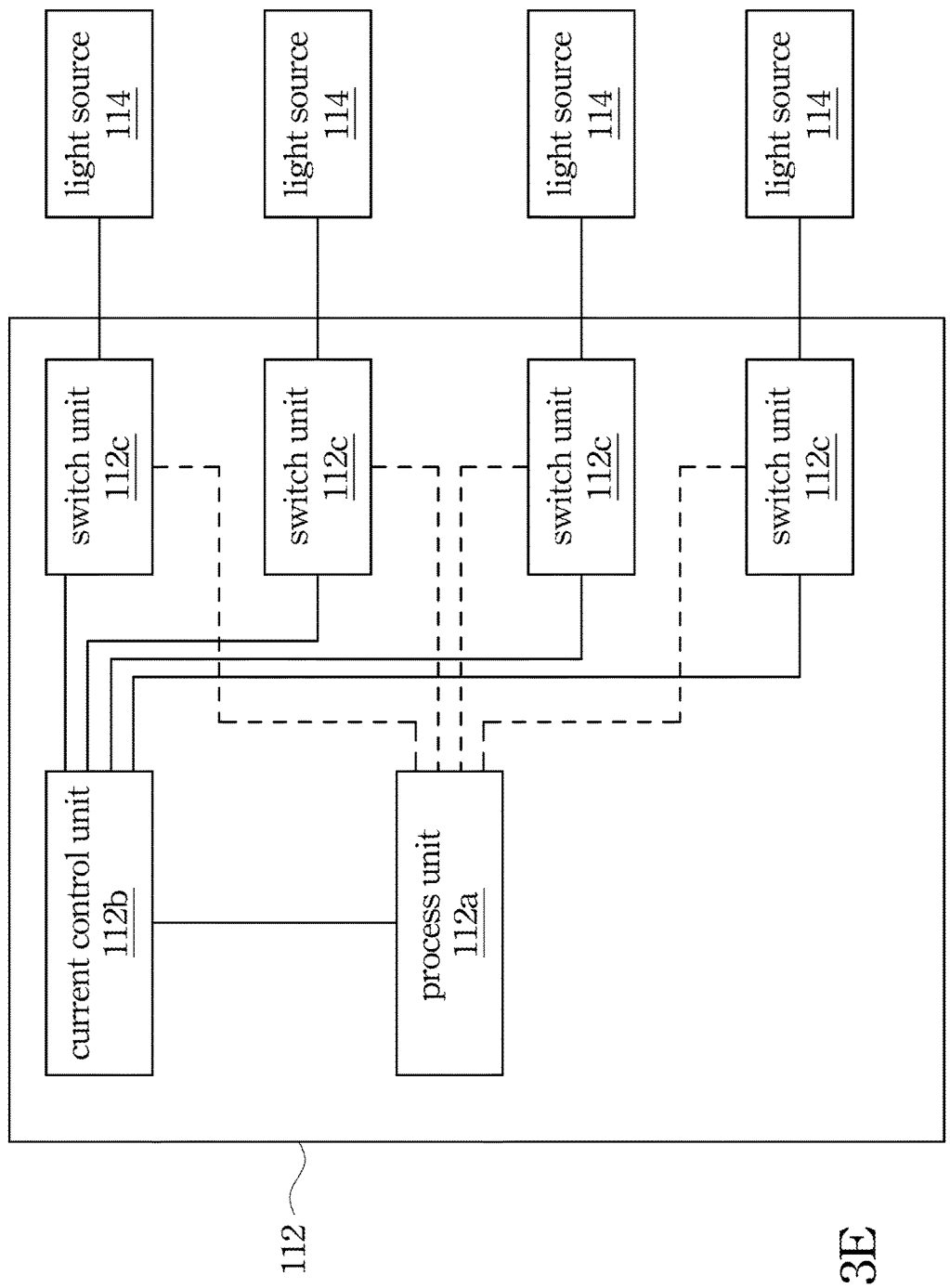

Furthermore, the switch units 112c are not limited to being electrically connected between the current control unit 112b and the light sources 114, and the switch control signals are not limited to being provided by the current control unit 112b. For example, in another embodiment, as shown in FIG. 3D, the switch units 112c can be electrically connected between the light sources 114 and ground bias. For another example, as shown in FIG. 3E, the switch control signals can be provided by the processing unit 112a, wherein the dotted lines in FIG. 3D and FIG. 3E represent exemplary paths of the switch control signals.

Figure 4:
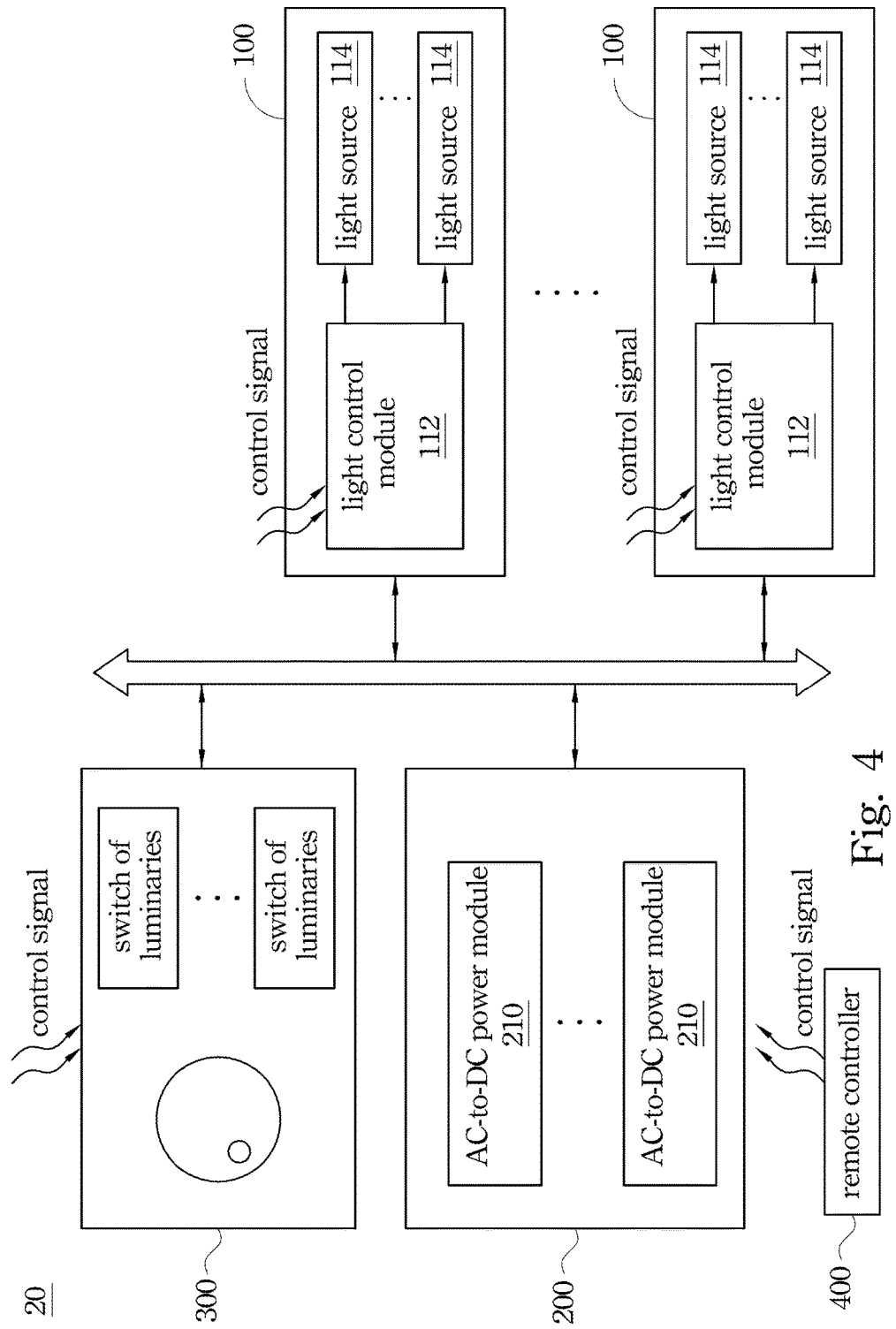
FIG. 4 is a schematic functional block diagram showing a lighting system in accordance with an embodiment of the present invention.

Referring to FIG. 4, it is a schematic functional block diagram showing a lighting system 20 in accordance with an embodiment of the present invention. The lighting system 20 shown in FIG. 4 is similar to the lighting system 10 shown in FIG. 1, except that the lighting system 20 has an additional remote controller 400, and that the processing unit 112a of the luminaire 100 has long distance detection function. The lighting system 20 allows users to control brightness of luminaire 100 by using the wireless remote controller 400. When the user presses a button of the remote controller 400, the processing unit 112a of the luminaire 100 will receive the control signal emitted by the remote controller 400, then adjusts the switch units 112c, and controls the value of the current emitted by the current control unit 112b in accordance with the user control signal, in order to turn on/off as well as adjust brightness of the light sources 114. In comparison with the lighting system 10, the lighting system 20 is more convenient.

Besides, the remote controller 400 can be a smart phone. For example, a user may download the application software (APP) from the internet so as to enable the smart phone to emit wireless signals to control the processing unit 112a.

It is noted that, in another embodiment, the light-adjusting device 300 may have long distance detection function allowing the user to control the operation of light-adjusting device 300 from long distance.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lighting system, comprising:
   at least one light source;
   a light control module electrically connected to the at least one light source for receiving DC power to drive the at least one light source;
   a housing receiving the at least one light source and the light control module; and
   a plurality of AC-to-DC power modules, wherein each one of the plurality of AC-to-DC power modules is disposed independently from the housing to provide the DC power which is autonomous for the light control module in accordance with only the DC voltage of all the AC-to-DC power modules.

2. The lighting system of claim 1, wherein the at least one light, source is a light emitting diode (LED).

3. The lighting system of claim 1, further comprising a dimming module electrically connected to the light control module to provide a control signal to the light control module.

4. The lighting system of claim 3, further comprising a remote controller, wherein the remote controller transmits the control signal to the light control module or the dimming module by using a wireless transmission technology.

5. The lighting system of claim 1, further comprising a power line disposed through the housing and electrically connected between the light, control module and the plurality of AC-to-DC power modules to provide DC bias to the light control module.

6. A lighting system, comprising:
   at least one light source;
   a light control module electrically connected to the at least one light source for receiving DC power to drive the at least one light source; and
   a plurality of AC-to-DC power modules, wherein each one of the plurality of AC-to-DC power modules is coupled with the light control module to provide the DC power which is autonomous for the light control module in accordance with only the DC voltage of all the AC-to-DC power modules.

7. The lighting system of claim 6, wherein the at least one light source is a light emitting diode (LED).

8. The lighting system of claim 6, further comprising a dimming module electrically connected to the light control module to provide a control signal to the light control module.

9. The lighting system of claim 8, further comprising a remote controller, wherein the remote controller transmits the control signal to the light control module or the dimming module by using a wireless transmission technology.

10. A lighting system, comprising:
   at least one light source;
   a light control module electrically connected to the at least one light source for receiving DC power to drive the at least one light source;
   a housing receiving the at least one light source and the light control module; and
   a plurality of AC-to-DC power modules, wherein each one of the plurality of AC-to-DC power modules is mounted outside of the housing to provide the DC power which is autonomous for the light control module in accordance with only the DC voltage of all the AC-to-DC power modules, and each AC-to-DC power module is hot pluggable for replacing to adjust the output performance of the DC power for the light control module instead of interrupting the DC power.

11. The lighting system of claim 10, wherein the at least one light source is a light emitting diode (LED).

12. The lighting system of claim 10, further comprising a dimming module electrically connected to the light control module to provide a control signal to the light control module.

13. The lighting system of claim 12, further comprising a remote controller, wherein the remote controller transmits the control signal to the light control module or the dimming module by using a wireless transmission technology.

14. The lighting system of claim 10, further comprising a power line disposed through the housing and electrically connected between the light control module and the plurality of AC-to-DC power modules to provide DC bias to the light control module.

* * * * *